(12) United States Patent  (10) Patent No.: US 7,315,142 B2
Lindemann et al.  (45) Date of Patent: Jan. 1, 2008

(54) METHOD FOR EFFECTING THE POWER-OPTIMAL CONTROL OF BLDC MOTORS

(75) Inventors: Harald Lindemann, Nauendorf (DE); Joergen Sturm, Weimar (DE)

(73) Assignee: Melexis GmbH, Erfurt (DE)

( * ) Notice: Subject to any disclaimer, the term of this patent is extended or adjusted under 35 U.S.C. 154(b) by 0 days.

(21) Appl. No.: 10/547,136

(22) PCT Filed: Feb. 24, 2004

(86) PCT No.: PCT/DE2004/000334

§ 371 (c)(1), (2), (4) Date: Apr. 27, 2006

(87) PCT Pub. No.: WO2004/077657

PCT Pub. Date: Oct. 9, 2004

(65) Prior Publication Data

US 2006/0279242 A1  Dec. 14, 2006

(30) Foreign Application Priority Data

Feb. 27, 2003 (DE) ............................... 103 08 859

(51) Int. Cl.
*H02K 29/00* (2006.01)
(52) U.S. Cl. ...................... 318/138; 318/439; 318/254; 318/139; 318/606
(58) Field of Classification Search ................ 318/138, 318/439, 254, 139, 606, 608
See application file for complete search history.

(56) References Cited

U.S. PATENT DOCUMENTS 5,221,881 A   6/1993  Cameron
5,294,877 A   3/1994  Cameron
5,317,243 A   5/1994  Cameron
5,517,095 A   5/1996  Carobolante et al.
5,572,097 A   11/1996 Cameron
5,616,996 A   4/1997  Tang et al.
2003/0231875 A1  12/2003  Masino
2004/0070356 A1  4/2004  Masino
2004/0239274 A1*  12/2004  Karwarth et al. ........... 318/439

FOREIGN PATENT DOCUMENTS

EP   0231046    8/1987
JP   2002-034277  4/2002
WO   01/37419   5/2001
WO   03/107526   12/2003

OTHER PUBLICATIONS

English Language Abstract of JP 2002-034277.

* cited by examiner

*Primary Examiner*—Karen Masih
(74) *Attorney, Agent, or Firm*—Greenblum & Bernstein, P.L.C.

(57) ABSTRACT

A method for a power optimal control of a BLDC motor by continuously updated commutation points and circuit assembly for a power optimal control of a BLDC motor. The method includes measuring a time difference ($\Delta T$) between two immediately subsequent zero crossings (TN1, TN2) of first and second motor phases, and performing a commutation of an immediately next motor phase after substantially one-half of the time difference ($\Delta T/2$) elapses after the zero crossing of the second motor phase (TN2). The commutation is performed for all phases in a continuous manner in accordance with a switching algorithm ($T_{commutation} = TN2 + (\Delta T/2)$).

21 Claims, 4 Drawing Sheets

METHOD FOR EFFECTING THE POWER-OPTIMAL CONTROL OF BLDC MOTORS

CROSS-REFERENCE TO RELATED APPLICATIONS

The present application is a U.S. National Stage of International Patent Application No. PCT/DE2004/000334 filed Feb. 24, 2004, and claims priority of German Patent Application No. 103 08 859.8 filed Feb. 27, 2003. Moreover, the disclosure of International Patent Application No. PCT/DE2004/000334 is expressly incorporated by reference herein in its entirety.

BACKGROUND OF THE INVENTION

1. Field of the Invention

The present invention relates to a method and a circuit for an enhanced, particularly error tolerant, control of a multiphase (typically 3-phase) brushless DC motor (brushless direct current motor—BLDC motor) based on permanently measured motion information by evaluating the points in time of the reversal of the induced voltage (zero crossing) within two non-current-carrying motor coils, which in the temporal progression passed the commutation point in an immediately consecutive manner.

2. Discussion of Background Information

BLDC motors are driven with an electromagnetic rotating field, which rotates synchronously with the rotor field. The synchronism of the fields, as well as their phase difference, are critical for the efficiency of the operation of this type of motor. It may, therefore, be appreciated that during operation information on the momentary phase difference of both fields is required at any time.

In BLDC motors having hall elements, these elements generate the required position information. This information is then directly translated into the switching of the motor phases (the commutation), thereby fixedly adjusting the angle between the stator and the rotor field. This corresponds to a singular working point that depends on the type of motor, its speed, and load; an optimal motor operation is guaranteed at this working point only.

In WO-A 01/37419, a method is described for shifting the commutation point of a BLDC motor whose stator coils are fed by a multiphase frequency converter circuit. The frequency converter circuit comprises a power stage, a commutation logic, a phase selector and a phase discriminator. A commutation detector receives on a first input the momentary value of a voltage induced during a non-current-carrying phase, which is detected by a phase selector, and also receives a reference voltage on a second input for comparing both input voltages. The reference voltage may be modified by a commutation shifter in accordance with a predefined function. The commutation shifter receives from a controlled-variable calculator a target value that depends on the target speed of the motor. Due to the commutation shift that depends on the target value, even with high speeds and a heavy load, a high motor torque is available and the variation in torque is kept at a low level.

In patent document EP-B 231 046, a commutation circuit is described, which operates without any sensors, wherein each phase may be switched, depending on voltages which are induced in the coils by the permanent magnetic field of the rotor, by electronic switching elements depending on the state of commutation for performing commutation steps at the negative and/or positive terminal of a DC current source, wherein a comparison signal is generated in the control circuit, which indicates whether the sign of that coil voltage that is not connected to the DC source by means of the electronic switching elements, coincides with a sign that is predefined on the basis of the currently valid commutation state and, in case of non-coinciding signs, the phase is otherwise commutated.

In Japanese patent document, Publication 2002/034277 A, Application No. 2000212209, the error in the motor voltage is maintained at a low level for a change of the motor speed within a single rotation, in that mean values of all measured rotor sector positions of a full rotation of the rotor to determine the time interval from one rotor position to the next by calculation, and errors of the corresponding determined positions are used, on the basis of which the points in time for the supply of energy are controlled.

These methods are less efficient compared to the solution of the present invention, that is, the time between the detection of the change of rotor speed and the activity for correcting the error is longer.

SUMMARY OF THE INVENTION

The present invention reduces the reaction time for actively operating in response to a load dependent rotation or torque change in a BLDC motor.

According to the present invention, therefore in each motor state, the commutation point, i.e., the switching into the subsequent motor state, is actively influenced depending on the load. The current position information required therefore is permanently obtained. This information is continuously obtained from a terminal of the respective freewheeling motor coil by electromagnetic induction or by an intelligent evaluation of the hall signals. In this way, the control of BLDC motors without sensors and BLDC motors commutated on the basis of hall sensors may be optimized in a load dependent and dynamic manner. Any corrections that may be required with respect to the switching point of time may be possible at any time.

BRIEF DESCRIPTION OF THE DRAWINGS

The present invention is further described in the detailed description which follows, in reference to the noted plurality of drawings, in which like reference numerals represent similar parts throughout the several views of the drawings, and wherein.

DETAILED DESCRIPTION OF THE PRESENT INVENTION

The present invention will be explained in an exemplary manner on the basis of a 3-phase motor system. It should be appreciated that any BLDC motor may be controlled, irrespective of whether it is a sensorless type or whether it is equipped with Hall elements, and having an arbitrary number of pole pairs provided in a star connection or a delta connection. In principle, the technique may also be extended in this respect to multiphase systems. The number of magnet poles of the rotor is of no relevance for the inventive technique. Since a multipole system may always be mapped into a two-pole system, in the following description, a two-pole system is used. The required stator rotational field is impinged on the motor by successive rotating square signals applied to respective two of the three motor phases in a conventional manner. These signals may be pulse width modulated so as to control the effective energy or to approximate the switching edges according to an ideal sinusoidal control. Moreover, the generation of the magnetic field of the rotor will not be described, since this is not essential for the present invention. For convenience, this field is assumed as being constant and as being generated by a permanent magnet.

Figure 1:
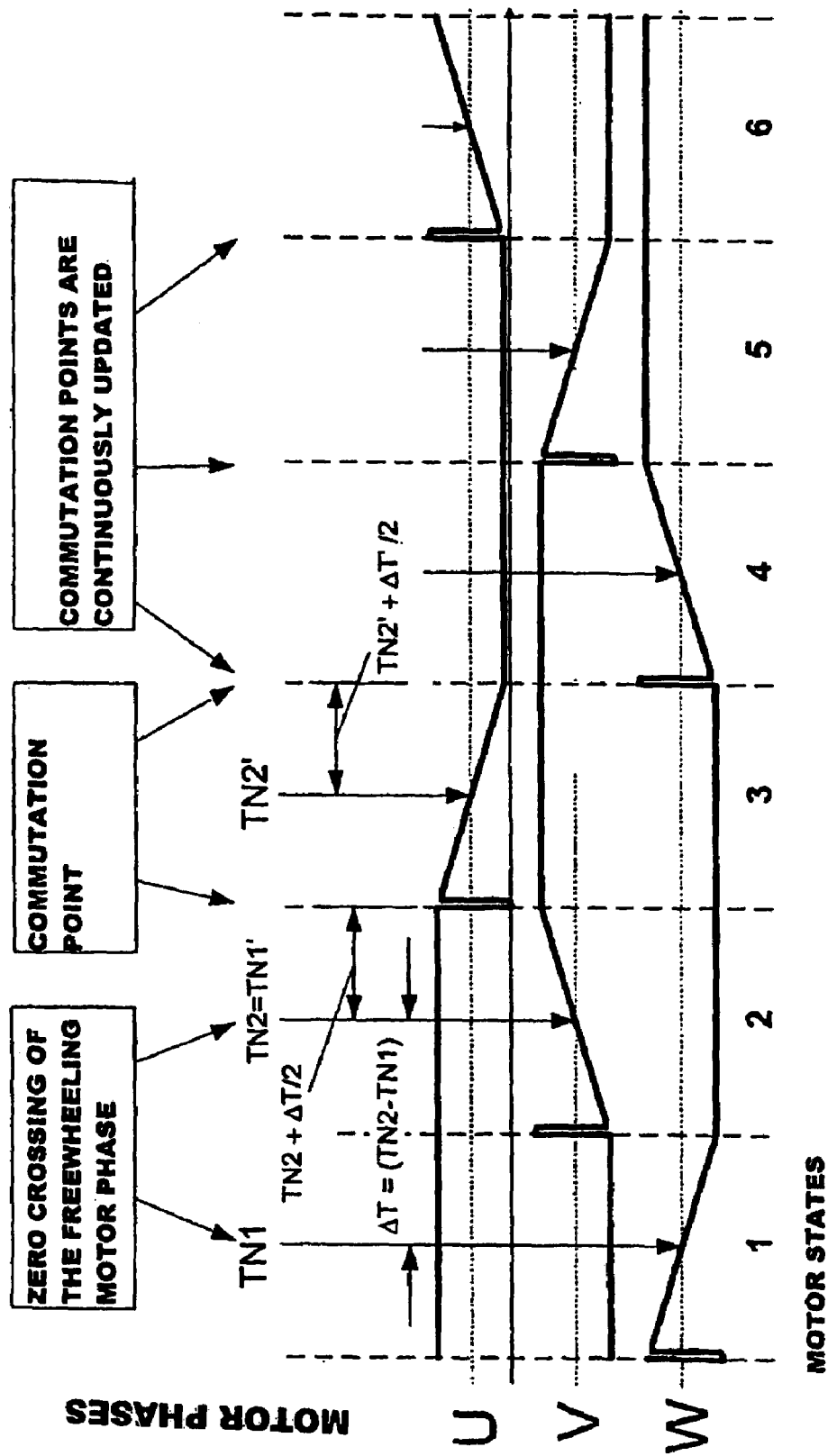
FIG. 1 illustrates the commutation between motor phases.

To implement the method according to the present invention, a permanently available position information is required. Since this information may be obtained by the evaluation of the reversal of the induced voltage across a motor coil in which no current is presently flowing, this situation will hereinafter be referred to as "zero crossing". The term "motor state" refers to the constant application of a voltage (with or without pulse width modulation) across two motor phases. The switching of the voltage to other motor phases is referred to as "commutation" or "state change" (cf. FIG. 1). When the BLDC motor, after starting, has reached a stable detectable zero crossing, the controlling is activated. To this end, the time information $\Delta T$ between the zero crossing in the last motor state (TN1) and the zero crossing in the immediately subsequent motor state (TN2) is measured:

$$\Delta T = (TN2 - TN1)$$

From this corresponding point in time TN2, after the half time span between the last two zero crossings: $\Delta T/2$ (or according to a correspondingly corrected value), it is actively switched into the subsequent motor state:

$$T_{commutation} = TN2 + (\Delta T/2) \quad [1]$$

This method will continuously be applied. Thus, an influence is effected before each switching into the subsequent state.

The points in time of the respective zero crossings are load dependent; therefore, a switching operation according to this algorithm [1] enables to immediately react in response to a stepwise change in load.

In order to determine the energy-optimal point in time for the commutation, it is necessary to take into consideration in the calculation the time required to remove the energy in the non-current-carrying motor phase used for the position measurement during the switching into the non-actively current-fed state. For this purpose, appropriate measures are to be provided, when the position information is obtained as described above.

Due to the motor geometry and the characteristic curves of the torque determined thereby, it may be necessary to subsequently correct the commutation point obtained by the algorithm. Hereby, the dynamic of the method is not affected.

Due to the switching and also due to the possible employment of pulse width modulated signals, interferences in the voltage signal of the freewheeling motor phase may occur. These interferences have to be filtered in an intelligent manner.

Figure 2:
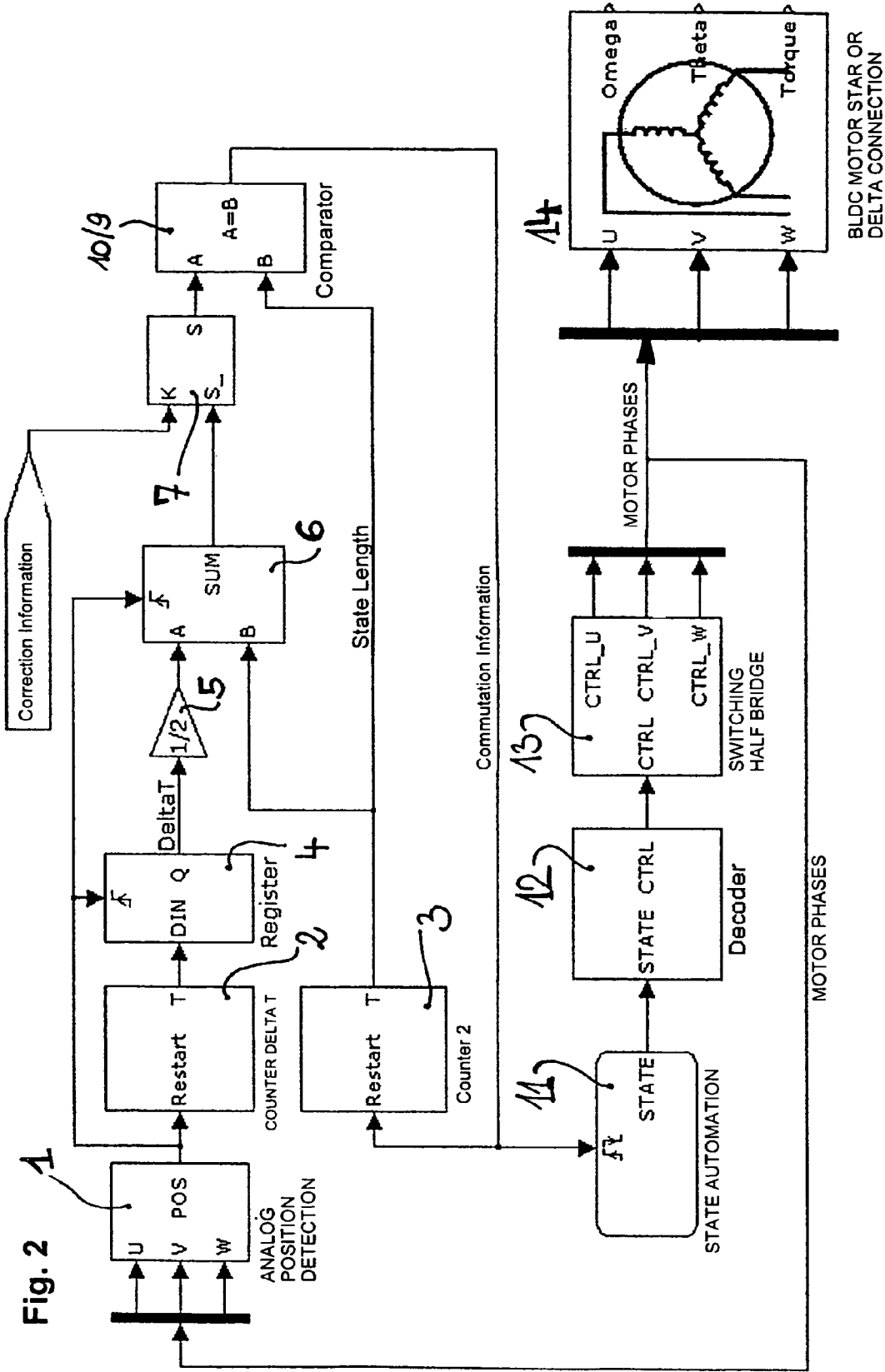
FIG. 2 illustrates a realization of the switching technique according to the invention.
Figure 2A:
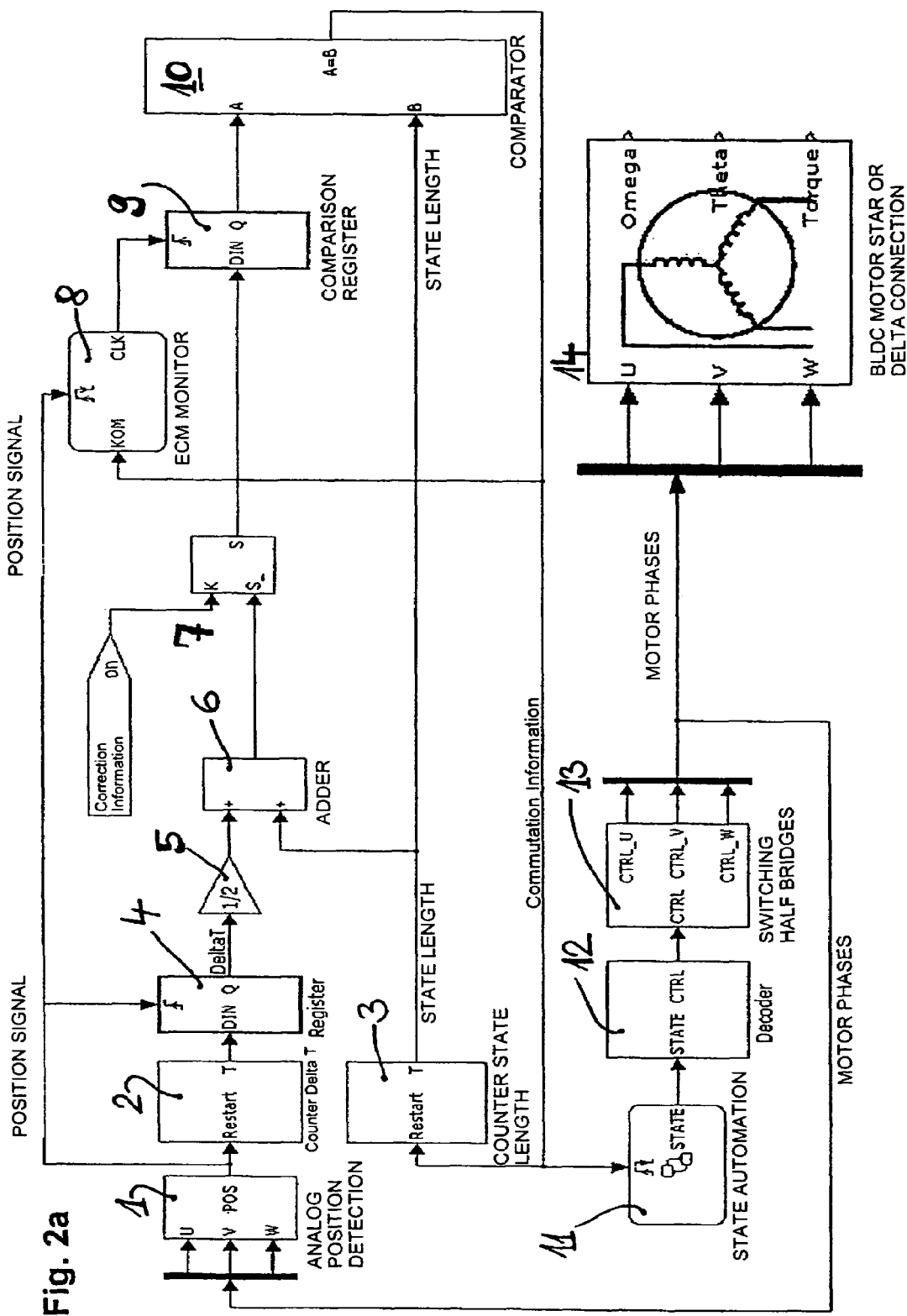
FIG. 2a illustrates an alternative realization of the switching technique according to the invention.

As an example for a possible realization of the switching technique according to the above-described algorithm, a substantially digital realization is assumed, wherein a mixture of hardware and software may be employed (cf. FIG. 2 and FIG. 2a). An analog input circuit (ADC or intelligent comparator) supplies the position information. This information is appropriately filtered and is provided to the subsequent digital control unit. The digital control unit substantially comprises two programmable counters, a state automation, some buffer storages, and a decoder. A counter evaluates the position information between respective subsequent states from $\Delta T = (TN2 - TN1)$ and stores the detected difference in a buffer storage. A further readable counter is started at the beginning of each motor state. When the counter reaches the value $TN2 + \Delta T/2$, the state automation is triggered. The state automation performs a commutation of the motor signals, thereby activating the respective subsequent state. For driving the motor, switching half bridges may be used, wherein the driving signals are directly decoded from the state vector. For the sake of simplicity of the presentation, a pulse width modulation of the bridge signals is not used in this exemplary embodiment.

Figure 3:
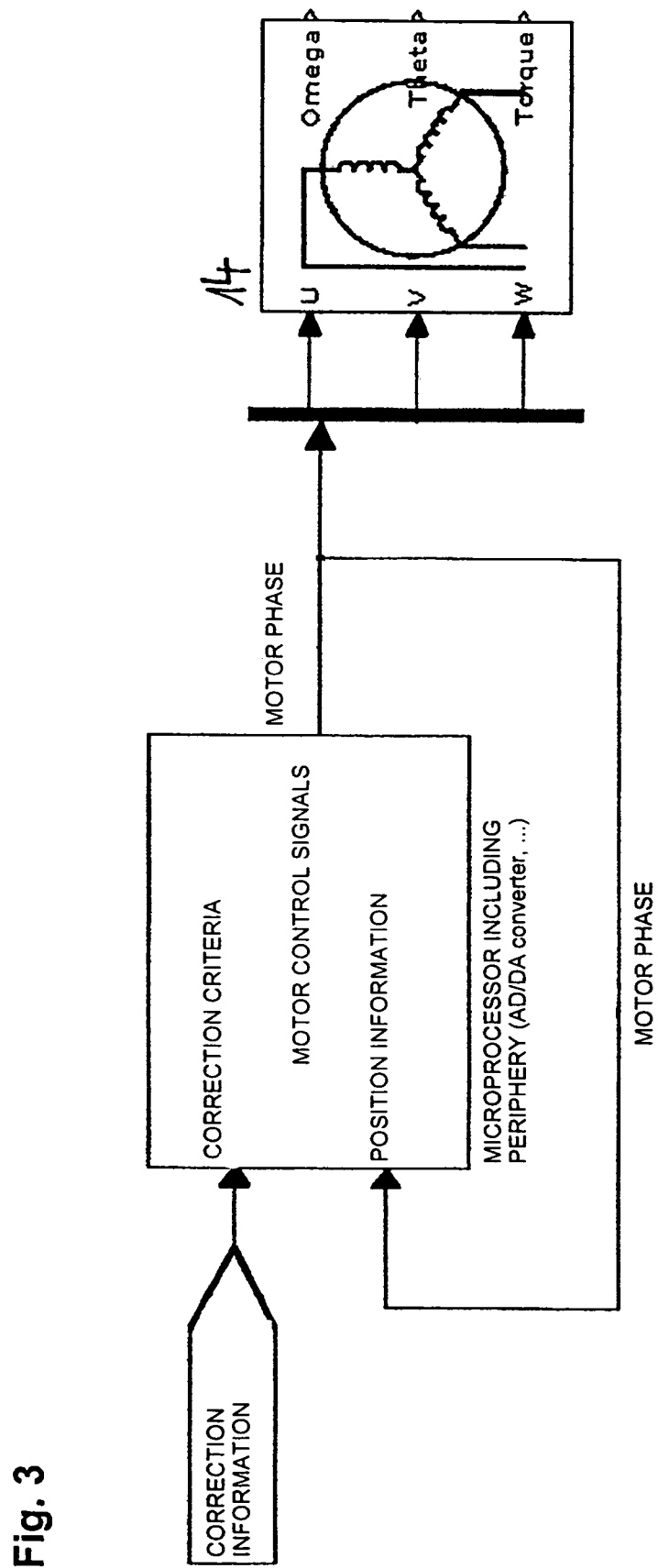
FIG. 3 illustrates the invention implemented in a microprocessor circuitry.

The inventive method may also be implemented in a microprocessor circuitry, which is configured to detect the positioning information, for instance, by means of analog-to-digital converters, and which may have outputs that may directly drive the motor via corresponding power switches (cf. FIG. 3).

Advantages of the digital realization of the controlling scheme according to the inventive algorithm [1] are as follows:
- the provision of control capabilities even when the ECM information is lacking;
- correction in each sub-step of the algorithm is applicable;
- also applicable to pulse width modulated signals;
- optimisation for forward and backward rotation is simultaneously possible, even with BLDC motors that are commutated on the basis of hall sensors.

What is claimed is:

1. A method for a control of a BLDC motor by continuously updating commutation instants, wherein the method utilizes a switching algorithm for commutation instants ($T_{commutation}$) comprising:
   measuring a time difference ($\Delta T$) between two immediately subsequent zero crossings (TN1, TN2) of a first and a second motor phase; and
   performing a commutation at a commutation instant ($T_{commutation}$) of an immediately next motor phase after the second motor phase after substantially one-half of the time difference ($\Delta T/2$) elapses after the zero crossing (TN2) of the second motor phase;
   and wherein in a continuous manner further commutations at further commutation instants for all phases are performed in accordance with said switching algorithm.

2. The method in accordance with claim 1, wherein the measuring and performing continuously recurs.

3. The method in accordance with claim 1, wherein the zero crossings of the first and second motor phases correspond to points in time of a reversal of a respective induced voltage across a respective non-current-carrying motor coil.

4. The method in accordance with claim 1, wherein the switching algorithm is repeatedly performed for an error tolerant control of the BLDG motor.

5. The method in accordance with claim 1, further comprising correcting a value corresponding to the one-half of the time difference ($\Delta T/2$) in the switching algorithm according to a time required for removal of an energy within a non-current-carrying motor phase used for position measurement when switching into a non-actively current fed state.

6. The method in accordance with claim 1, further comprising correcting the further commutation instants to achieve an adapted operation corresponding to a torque characteristic determined by a motor geometry of the BLDG motor.

7. The method in accordance with claim 6, wherein the motor geometry comprises at least one of construction and number of rotor or stator poles.

8. A circuit assembly for control of a BLDC motor, said circuit assembly being structured and arranged to provide continuously updated commutations, the circuit assembly comprising:
   a measuring circuit for measuring a time difference between two Immediately subsequent zero crossings of first and second motor phases;
   a device for performing a commutation of an immediately next motor phase after substantially one-half of the time difference has elapsed after the zero crossing of the second motor phase;
and wherein the commutation performing device is adapted to perform further commutations for all phases in a continuous manner in accordance with a switching algorithm in which a time instant for commutation equals the time instant of the zero crossing in the second motor phase and substantially one half of the time difference.

9. The circuit assembly according to claim 8, further comprising:
   an analog input circuit structured and arranged to supply position information to a digital control unit;
   the digital control unit comprising two programmable counters, a state automation device, storage buffers and a decoder, wherein the position information between respective subsequent states is evaluated in one of the two programmable counters and an evaluated difference is stored in one of the storage buffers;
   a further readable counter structured and arranged to start counting at a beginning of each motor state,
   wherein the state automation device is structured and arranged to be triggered when the further readable counter reaches a count value corresponding to the zero crossing time of the second motor phase and the one-half of the time difference, so that the state automation device performs the commutations of the motor signals thereby activating each subsequent state,
   wherein half bridges of switches are provided, are structured and arranged for motor control and driving control signals are directly decodable from a state vector.

10. The circuit assembly according to claim 9, wherein the analog input circuit comprises one of an analog to digital converter and an intelligent comparator.

11. The circuit assembly according to claim 9, wherein the position information is filtered before being supplied to digital control unit.

12. The circuit assembly according to claim 9, wherein the evaluated difference stored in the one storage buffer comprises a measured difference.

13. The circuit assembly according to claim 8, further comprising a microprocessor structured and arranged to perform the time measurements and calculations of the switching algorithm.

14. A circuit assembly for an error tolerant power optimal control of BLDC motors, the circuit assembly adapted to implement a switching algorithm and comprising:
   an analog position detection unit (1) connected to a first counter (2), said counter feeding a register (4);
   the register adapted for storing an actual time difference between a zero crossing time of a second motor phase and a first motor phase continued in time and coupled to a binary divider (5);
   the binary divider coupled to an adding circuit (6);
   a second counter (3) coupled to be started with each state transition and adapted to provide a state length;
   the adding circuit adapted for summarizing the values of the binary divider and the second counter to provide a calculated next state transition as commutation;
   a correction logic (7) for correction of the next calculated commutation;
   a comparator circuit (9,10) for obtaining a respective commutation signal when the counter for providing the state length provides a value that equals to a value from the correction logic, to operate error tolerant, if the position information of the position detection unit is lost, so that continuously adapted commutations are provided;
   an ECM monitor circuit (8) structured and arranged to monitor an ECM operation so that, upon a lack of valid position information or non-identified position information from the analog position detection unit, a most recently obtained commutation state length is still available for use by the comparator circuit.

15. The circuit assembly in accordance with claim 14, wherein the circuit assembly continuously performs a switching algorithm of providing a time point for commutation ($T_{commutation}$) that substantially equals the sum of the zero crossing time and substantially one half of the actual time difference.

16. The circuit assembly in accordance with claim 14, wherein the analog position detection unit is structured and arranged to be continuously operated.

17. The circuit assembly in accordance with claim 14, wherein the comparator circuit further comprises a comparison register for continuously loading updated commutation state lengths according to a ramp function.

18. The circuit in accordance with claim 17, wherein the continuous loading of the comparison register provides starting of the BLDC motor.

19. The circuit assembly in accordance with claim 14, further comprising a comparison register adapted for loading once with a corresponding state length to provide a defined rotational speed of the BLDC motor.

20. The circuit assembly in accordance with claim 14, further comprising half bridges of switches for supplying pulse-width modulated motor phases for controlling the motor by the switching of the half bridges.

21. The method of claim 14, the BLDC motor being a brushless commutated direct current motor, operated completely without pulse width modulation.

* * * * *